United States Patent [19]

McHugh

[11] 4,285,332
[45] Aug. 25, 1981

[54] BUILDING HAVING SOLAR HEATING SYSTEM

[76] Inventor: Thomas McHugh, 373 NW. 4th Diagonal, Boca Raton, Fla. 33432

[21] Appl. No.: 55,737

[22] Filed: Jul. 9, 1979

[51] Int. Cl.³ ............................. F24J 3/02; F24D 5/10
[52] U.S. Cl. .................... 126/429; 126/431; 126/435; 165/56; 165/175
[58] Field of Search ............... 165/47, 48, 48 S, 49, 165/56, 57, 173, 175; 52/173, 220, 168; 126/428, 417, 431, 429

[56] References Cited

U.S. PATENT DOCUMENTS

| | | | |
|---|---|---|---|
| 2,425,775 | 8/1947 | Yarborough | 165/49 |
| 2,496,189 | 1/1950 | Williams | 165/56 |
| 3,415,024 | 12/1968 | Kotlarz | 165/49 |
| 3,563,305 | 2/1971 | Hay | 165/49 |
| 3,893,506 | 7/1975 | Laing | 165/49 |
| 3,897,820 | 8/1975 | Teeter | 165/56 |
| 4,000,850 | 1/1977 | Diggs | 126/431 |
| 4,000,851 | 1/1977 | Hellemann | 126/431 |
| 4,062,347 | 12/1977 | Jensen | 126/431 |
| 4,068,652 | 1/1978 | Worthington | 126/431 |
| 4,069,809 | 1/1978 | Strand | 126/431 |
| 4,178,912 | 12/1979 | Felter | 126/431 |

*Primary Examiner*—Daniel J. O'Connor
*Attorney, Agent, or Firm*—Seidel, Gonda, Goldhammer & Panitch

[57] ABSTRACT

A building is disclosed an integrated solar heating system forming a part of the design of the building by a portion of the heating system being the structural support walls in the form of vertically disposed hollow vessels preferably made of metal. Insulation is applied to opposite sides of the vessels. A fluid is circulated from an upper manifold through heating panels to an intermediate manifold which in turn communicates with the upper end of the vessels. A lower manifold communicates with the lower end of the vessels and with said upper manifold by way of a pump. Ducts for circulating air to rooms of the building are in heat exchange relationship with the hollow vessels.

6 Claims, 10 Drawing Figures

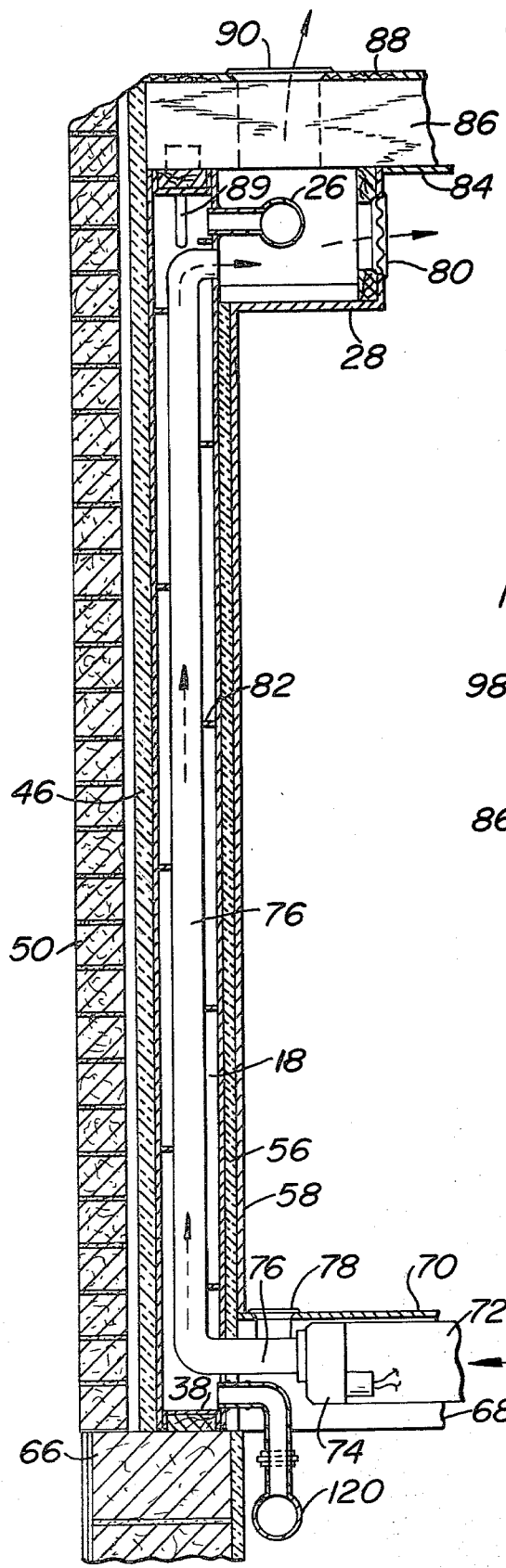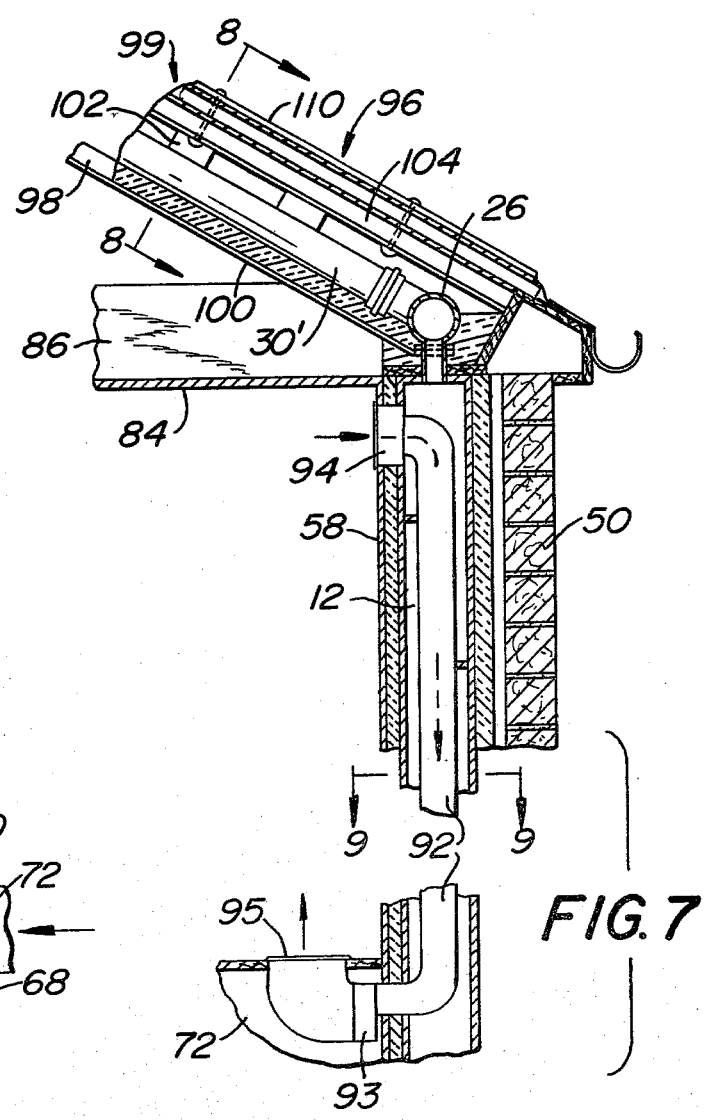

4,285,332

BUILDING HAVING SOLAR HEATING SYSTEM

BACKGROUND

A large number of solar heating systems have been suggested heretofore. The most relevant patents known to me are U.S. Pat. Nos. 2,425,775; 3,893,506; 4,000,850 and 4,000,851. While a great deal has been written about solar heating systems, I believe the most relevant is a book entitled "Solar Energy And Building" by S. V. Szokolay.

I believe a major defect of prior systems is the lack of the concept of using the solar heating system as an integrated part of the architecture of the building. This invention is a solution to that problem whereby the walls of the building perform a dual function, there is no need for a large water storage tank, etc.

SUMMARY OF THE INVENTION

The present invention is directed to a building having a solar heating system integrated in the architecture of the building. At least a portion of the outer perimeter walls of the building are defined by at least one and preferably a plurality hollow vessels disposed side by side and having a width substantially greater than the thickness. Insulation is applied to opposite side faces of said vessels.

One or more solar heating panels are integrated in an angled roof of the building and include a first manifold adjacent the upper ends of the panels and a second manifold adjacent the lower ends of said panels with conduits extending between said manifolds. A means provides communication between the second manifold and the upper end portions of said vessels. A third manifold communicates with the lower ends of said vessels. A means is provided for circulating a fluid from said third manifold to said first manifold.

In a preferred embodiment of the present invention, a fluid such as water containing antifreeze flows from the first manifold through the solar heating panels to the second manifold and is heated as it flows through said panels by the sun's energy. From the second manifold, the fluid moves downwardly through the vessels to the third manifold. From the third manifold, the fluid is pumped to the first manifold.

It is an object of the present invention to provide a building with a solar heating system integrated into the architecture of the building so that the structural component of at least some of the perimeter walls of the building are defined by hollow vessels forming a part of the solar heating system.

Other objects will appear hereinafter.

For the purpose of illustrating the invention, there is shown in the drawings a form which is presently preferred; it being understood, however, that this invention is not limited to the precise arrangements and instrumentalities shown.

FIG. 6 is a sectional view taken along the line 6—6 in FIG. 1.

FIG. 7 is a sectional view taken along the line 7—7 in FIG. 1.

Referring to the drawings in detail, wherein like numerals indicate like elements, there is diagrammatically shown in FIG. 1 the architecture of a building such as a residential home with an integrated solar heating system in accordance with the present invention.

Figure 1:
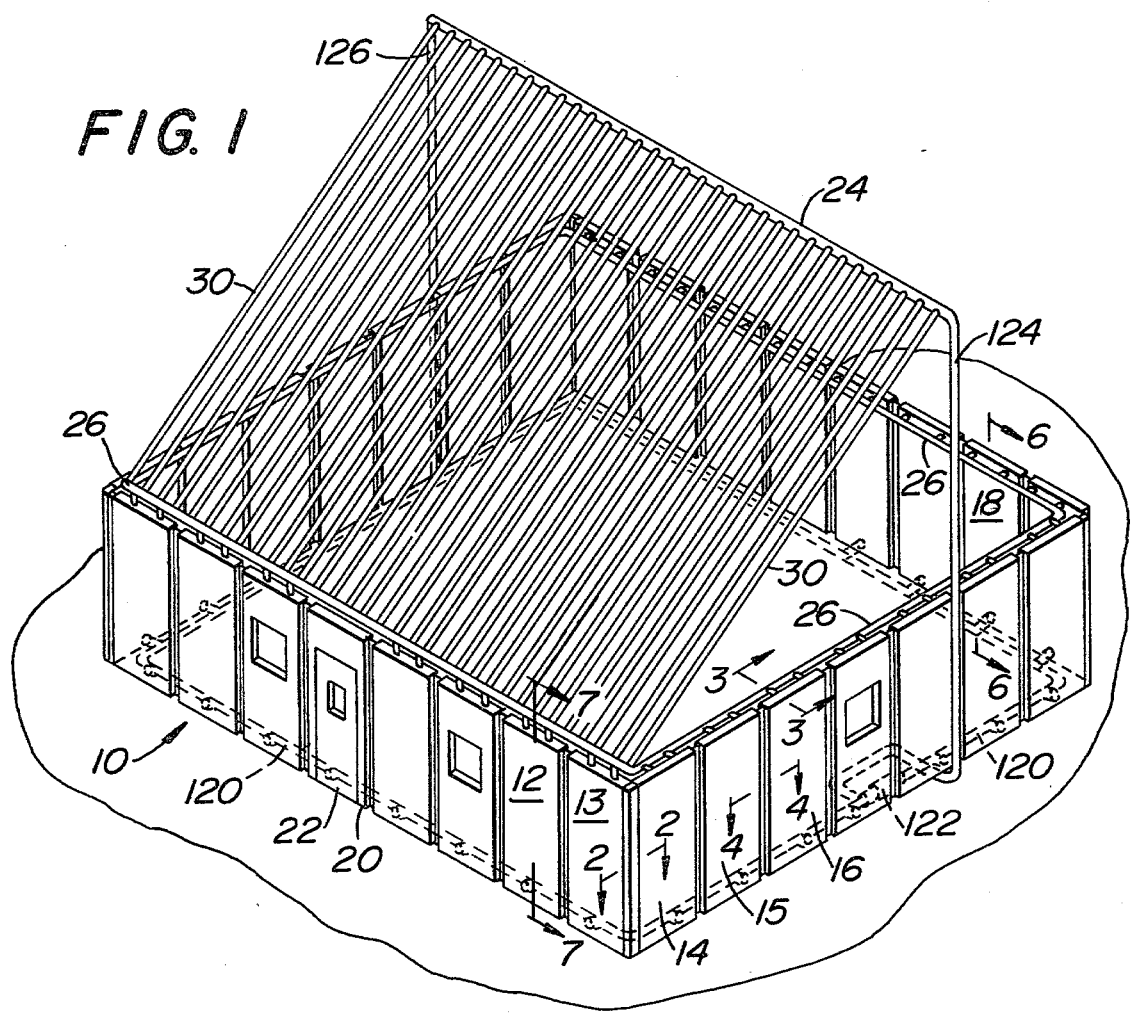
FIG. 1 is a diagrammatic illustration of a building in accordance with the present invention but with the exterior facing of the building not being illustrated.

The building 10 is shown in FIG. 1 with a rectangular perimeter. It will be apparent that the shape of the perimeter may vary as desired. At least a portion of the outer perimeter of the building 10, and preferably the entire perimenter except for doors and other obstructions, is defined by vertically disposed hollow vessels. A number of the vessels are defined by the numerals 12, 13, 14, 15, 16, 17 and 18. A number of the vessels are provided with rectangular windows for receiving window panes such as vessel 17. The number of such vessels having windows is a matter of choice. Wherever desired, framing 20 will be provided for a door 22 to permit access into and out of the building 10. The number of such doors is a matter of choice.

Figure 3:
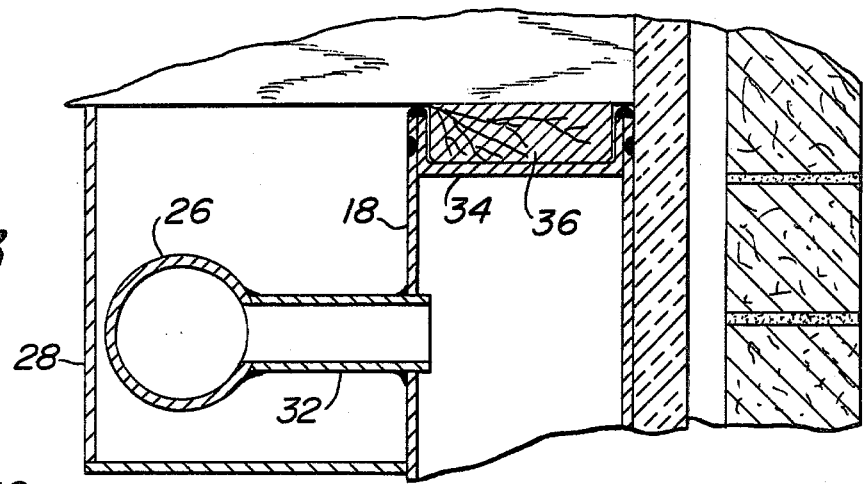
FIG. 3 is a sectional view taken along the line 3—3 in FIG. 1.

The building 10 is provided with a roof preferably disposed at an acute angle of about 30° to 60° with respect to the horizontal. A preferred angle for the roof is 35° to 38°. Adjacent the peak of the roof, there is provided a first horizontally disposed manifold 24 which also will perform the function of a ridge beam for the roof truss. Manifold 24 is preferably a 4 inch diameter steel pipe. A second manifold 26 is disposed at an elevation adjacent the lower end of the vessels 12-18. The second manifold 26 preferably extends around the entire inner periphery of the wall defined by said vessels 12-18, etc. If desired, the manifold 26 may be enclosed within a soffit 28. See FIGS. 3 and 6. A plurality of solar heating panels define a major portion of the angled roof and include a plurality of parallel conduits 30 which interconnect the manifolds 24 and 26. The manifold 26 communicates with each of the vessels forming the walls of the building 10 by way of a plurality of short conduits 32. See FIG. 3.

The vessels such as vessels 12-18 are hollow and preferably made from sheet metal such as 11 gauge steel. The vessels may be fabricated from two sheets of metal interconnected across their upper end by a trough 34 welded thereto and within which is disposed a nailing beam 36. See FIG. 3. A similar trough is welded to the lower edge of the steel sheets. See the lower end of FIG. 6.

Figure 4:
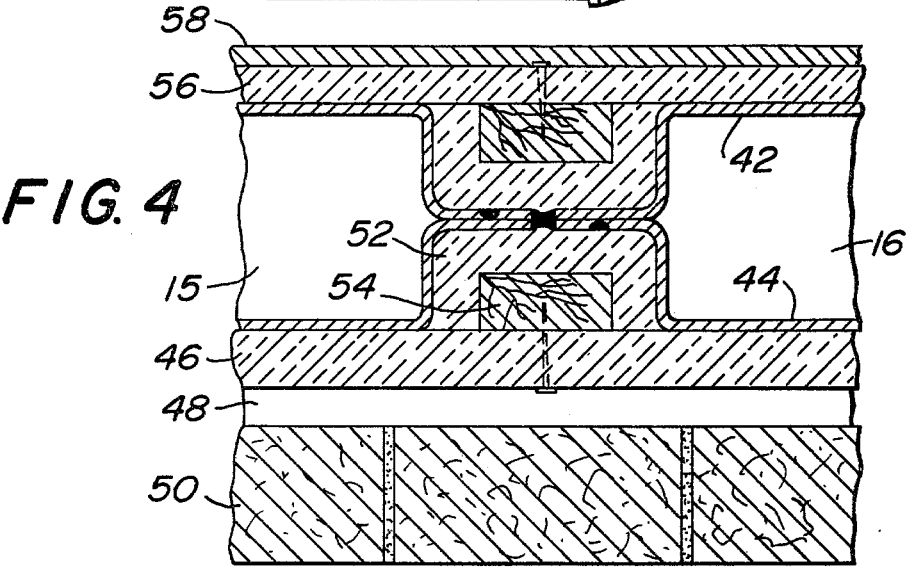
FIG. 4 is a sectional view taken along the line 4—4 in FIG. 1.

Referring to FIG. 4, side edge portions of the steel sheets 42, 44 are bent inwardly and then have outwardly extending flanges that are welded to each other. The vessels such as vessels 15 and 16 are disposed alongside one another with their welded flanges extending toward one another. An outer layer of insulation 46 such as a closed cell foam polymeric insulation material having a vapor barrier and a thickness of about 1½ inches is applied over the outer face of the vessels. See FIG. 4. An outer facing of conventional construction, such as brick facing 50, is applied in a conventional manner with a space 48 between the brick facing and the insulation 46.

The insulation 46 may be applied in any convenient manner such as by encasing a 2×4 wood pillar 54 within the U-shaped layer of insulation all disposed between the adjacent ends of vessels 15 and 16 as shown in FIG. 4. Thereafter, the insulation 46 may be nailed to the pillar 54. In a similar manner, a layer of insulation 56 may be applied over the inner face of the vessels and to which is attached an inner facing 58 such as ½ inch thick sheet rock.

Figure 5:
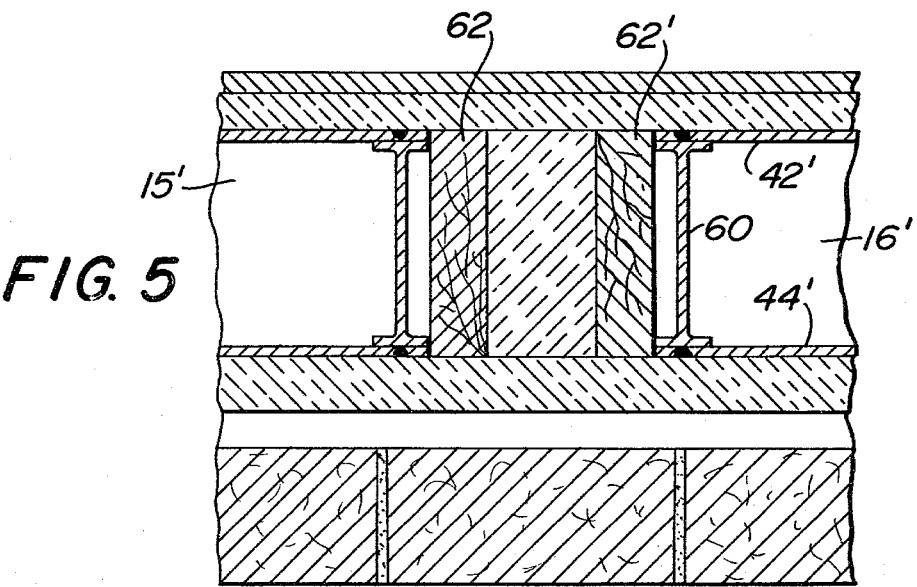
FIG. 5 is a cross-sectional view similar to FIG. 4 but showing an alternate construction.

As an alternative to the construction of the vessels shown in FIG. 4, see FIG. 5 wherein there is illustrated the adjacent vessels 15' and 16' of identical construction. Vessel 16' is constructed in the same manner as vessel 16 except that the metal layers 42' and 44' are interconnected along their side edges by way of a vertically disposed I-beam 60. Wooden pillars 62 and 62' may be provided between adjacent vessels to facilitate nailing the insulation thereto. Otherwise, the alternate construction of FIG. 5 is the same as that of FIG. 4.

Figure 2:
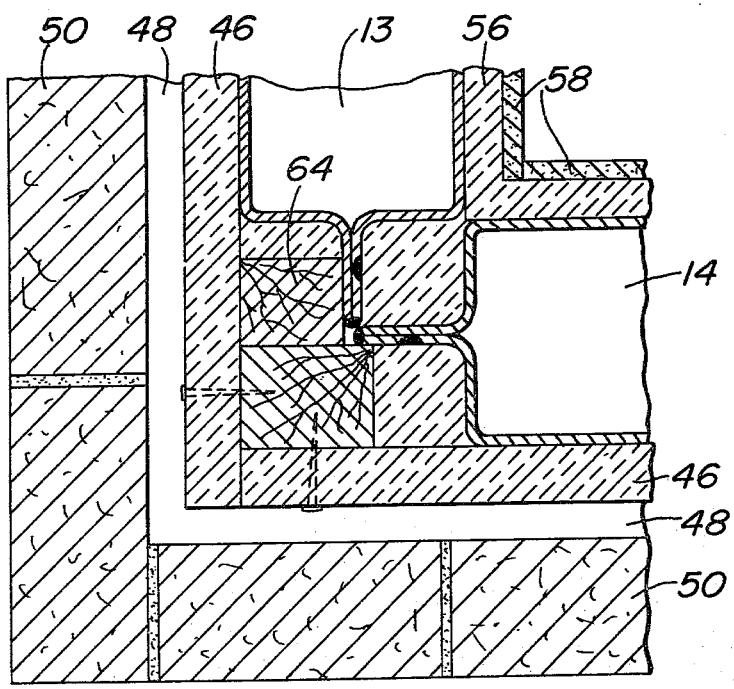
FIG. 2 is a sectional view taken along the line 2—2 in FIG. 1 and with exterior facing being illustrated.

At a corner of the building 10, the vessels 13 and 14 are at right angles to one another. Adjacent their side flanges, pillars 64 may be provided to facilitate nailing of components such as the layers of insulation 46. See FIG. 2.

In addition to acting as radiators, at least some of the vessels 12–18 act as heat exchangers. See FIGS. 6 and 7. The perimeter walls of the building 10 are supported by a foundation 66 having insulation and/or waterproofing on inner and outer faces thereof. The foundation 66 supports the ends of floor joist 68. A floor 70 is supported by the joist 68. A duct 72 is provided with a fan 74. The fan 74 is preferably a reversible fan so as to facilitate flow in opposite directions in duct 72. Duct 72 is connected at one end to one side of fan 74 and its other end may be connected to an auxiliary source of hot air such as an oil burner. Duct 76 is connected to the opposite side of the fan 74.

The duct 76 has a branch outlet 78 exiting through the floor 70. Outlet 78 has a grille which may be opened or closed. Duct 76 extends through a side wall of the vessel 18, upwardly along the length of vessel 18, and discharges into the soffit 28. Soffit 28 may have a grill 80 for flow of air into a room. Spacers 82, which may be perforated or appropriately dimensioned, are provided to maintain duct 76 in spaced relation with the inner surfaces of vessel 18 while at the same time not interferring with the flow of fluid through duct 18 in heat exchange relationship with duct 76.

The room above floor 70 has a ceiling 84 attached to the lower surface of the floor joist 86. A second floor 88 is supported by the joists 86. An outlet 90 communicates with the soffit 28 for transmitting heated air or other fluid to the rooms of the second floor. Between joists 86 there may be provided electrical immersion heaters 89 which extend downwardly into the upper end of the vessels. Joists 86 and the roof structure are supported by the peripheral walls of building 10.

In FIG. 7, there is shown an intersection of the angled roof containing heat exchange panel and one of the perimeter walls in another room of the building remote from the room represented by the structure shown in FIG. 6. A duct 92 extends upwardly in heat exchange relationship with the vessel 12 and has an inlet at grill 94 at one end thereof and an exit at grill 95 at the other end thereof. Air may be caused to circulate from the upper part of the room adjacent the ceiling 84 through grill 94, in heat exchange relationship with the fluid in vessel 12, and discharged upwardly at the floor grill 95 under the effect of fan 93.

Figure 8:
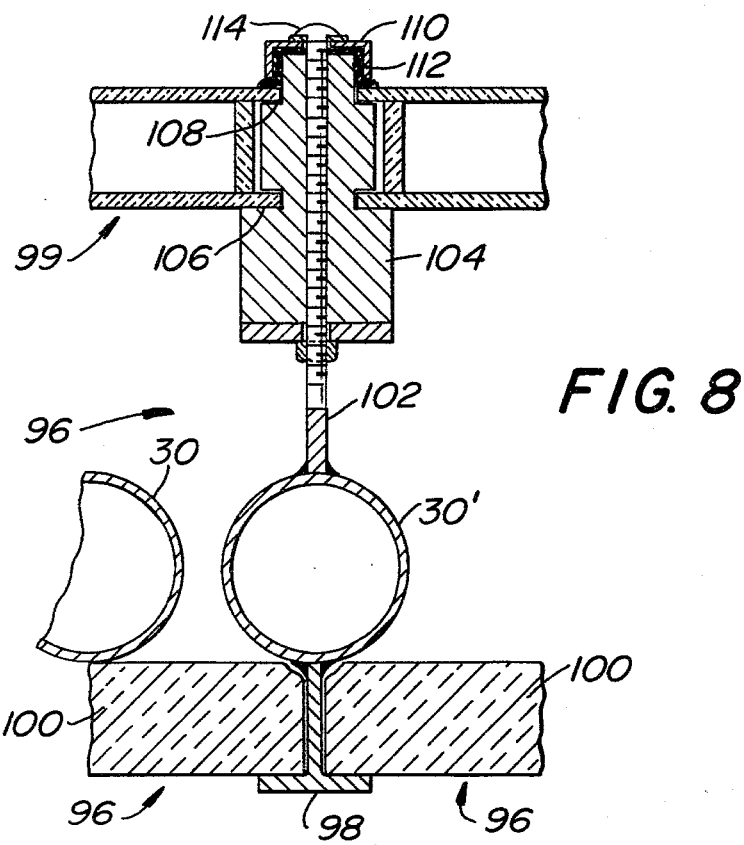
FIG. 8 is a sectional view taken along the line 8—8 in FIG. 7.
Figure 9:
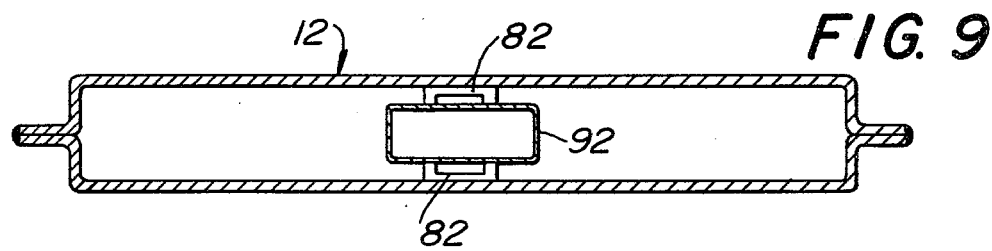
FIG. 9 is a sectional view taken along the line 9—9 in FIG. 7.

As shown more clearly in FIGS. 7 and 8, there is provided a plurality of solar panels 96 supported one adjacent the other. A variety of different constructions may be utilized for the panels 96. I prefer to prefabricate the panels 96 in sections with each section having a plurality of the conduits 30 terminating in a joint to facilitate coupling to the manifold 26 and a joint to facilitate coupling the other end of the conduits to the manifold 24. Each of the panels 96 has a plurality of conduits 30 supported by rigid insulated deck planks 100 and insulated transparent layers of material such as glass designated as 99.

Adjacent side edges of the panels 96 are provided with a common support including a T-beam 98 having its vertically disposed leg welded to a conduit 30'. Support ribs 102 are welded to the upper surface of conduit 30' at spaced points therealong.

The ribs 102 are secured by welding or the like to the lower end of a channel 104. Channel 104 has shoulders 106 on opposite side faces thereof for receiving one of the layers of glass and shoulders 108 at a higher elevation for receiving the other layer of glass. A seal 112 overlies adjacent edges of the top layers of glass and is held in place by cap 110. Cap 110 is fastened to the channel 104 at spaced points therealong by way of fasteners 114. The ends of the conduits 30' are coupled to the manifolds 24 and 26 so that a conduit forming part of the solar panels will be at the interface of adjacent panels 96 while at the same act as a support for the adjacent panels 96.

Figure 10:
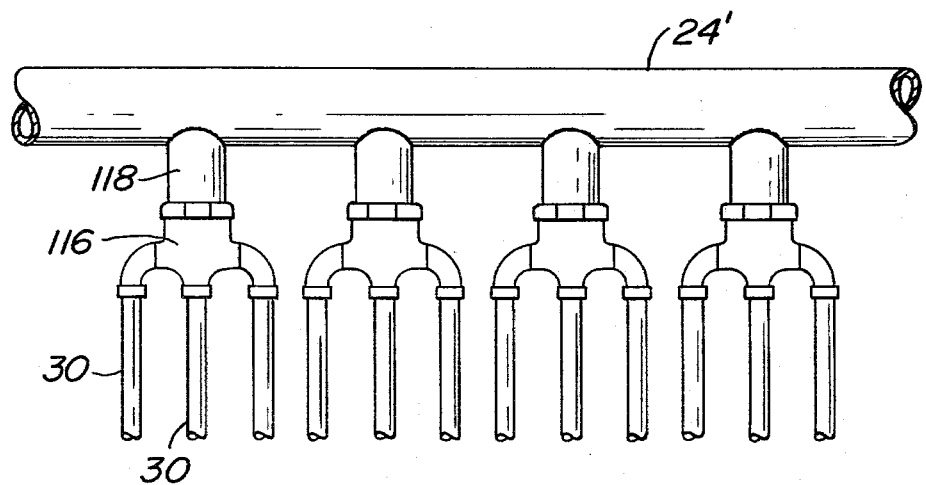
FIG. 10 is a partial elevation view of an alternate construction for the upper manifold and the conduits forming a part of the solar heating panels.

To minimize the hardware and expedite preassembly of panels 96, the conduits 30 may be connected to an alternate first manifold 24' by way of multidischarge coupling 116 which is removably coupled to pipes 118 welded to the manifold 24' at spaced points therealong. See FIG. 10.

The lower end of each of the vessels 12–18, etc. communicate by way of a conduit to a manifold 120. See FIGS. 1 and 6. The manifold 120 extends around the inner periphery of the building 10 and may be at an elevation slightly below the elevation of the ground floor. A pump 122 as shown in FIG. 6 communicates with the manifold 120 at its inlet end and with conduit 124 at its outlet end. Conduit 124 is a return conduit for returning the cooled fluid to the manifold 24. Manifold 24 may be supported at one end by conduit 124 and at its other end by a blind conduit or pillar 126.

Depending on practical considerations such as the distance of the building site from the factory, code restrictions on the size of structure that can be transported on the streets, etc., various alternatives are available. Thus, one whole wall of building 10 may be prefabricated with only a single vessel therein and then shipped to the building site. Alternatively, the vessels may be prefabricated at the factory with dimensions such as 8 feet high, 4 feet wide, and 3 inches deep, then shipped to the building site. The entire angled roof portion of the system including manifolds 24, 26 as well as the panels 96 may be prefabricated and shipped to the building site. Alternatively, manifolds 24, 26 may be in sections 4 feet long so as to correspond to the width of a panel 96, which are then coupled together at the job site.

Since the vessels are the load bearing walls of the building, erection of the building is faster than with other buildings having a solar heating system. Since the walls are the storage means for the circulating fluid, there is eliminated the need for a large underground storage tank and any attendant escavation and/or foundation for the tank. When fan 74 is shut off, natural connection can be attained by opening the grille at outlet 78. In climates prone to severe cold spells, electrical immersion heaters may be used at the upper ends of the vessels to supplement the heating of the circulating fluid.

The present invention may be embodied in other specific forms without departing from the spirit or essential attributes thereof and, accordingly, reference should be made to the appended claims, rather than to the foregoing specification as indicating the scope of the invention.

I claim:

1. A building having a solar heating system integrated in the architecture thereof comprising at least one outer perimeter side wall of the building being defined by hollow load bearing vessels, insulation on opposite major faces of said vessels, each vessel having a width substantially greater than its depth, at least one solar heating panel, said panel being inclined so as to have an upper end and a lower end mounted on a roof of the building; a first manifold at said panel upper end on the roof, a second manifold at said panel lower end, said panel including plural pipes extending between said manifolds, said second manifold communicating with the upper end of said vessels for delivering a heated fluid thereto, a third manifold communicating with the lower end of said vessels, means for circulating a fluid directly from said third manifold to said first manifold without passing through a heat exchanger reservoir, and an air circulating duct in heat exchange relationship with at least one of said vessels, at least one end of said duct communicating with a room of said building adjacent said perimeter side wall.

2. A building in accordance with claim 1 wherein said panel is integrated in an angled roof disposed at an acute angle of about 30° to 60° with respect to the horizontal, said first manifold being a rigid beam for the roof truss.

3. A building in accordance with claim 1 wherein said vessels extend for a height corresponding generally to the distance between a floor and a ceiling of a room, the vessels being made at least in part from sheet metal.

4. A building in accordance with claim 1 wherein said vessels are made of sheet metal, insulation disposed between juxtaposed faces of adjacent vessels, and said vessels extending from floor or ceiling, the width of said vessels being smaller than the height of the vessels.

5. A building in accordance with claim 1 wherein said second and third manifolds extend around the entire inside perimeter of said building.

6. A building in accordance with claim 1 wherein some of said vessels have a window opening therethrough.

* * * * *